United States Patent
Ballmer

(10) Patent No.: US 9,851,528 B2
(45) Date of Patent: Dec. 26, 2017

(54) OPTICAL COATING PERMITTING CAVITY SELF-LOCKING

(71) Applicant: Stefan Ballmer, Syracuse, NY (US)

(72) Inventor: Stefan Ballmer, Syracuse, NY (US)

(73) Assignee: SYRACUSE UNIVERSITY, Syracuse, NY (US)

( * ) Notice: Subject to any disclaimer, the term of this patent is extended or adjusted under 35 U.S.C. 154(b) by 316 days.

(21) Appl. No.: 15/174,475

(22) Filed: Jun. 6, 2016

(65) Prior Publication Data

US 2016/0356983 A1     Dec. 8, 2016

Related U.S. Application Data

(60) Provisional application No. 62/171,663, filed on Jun. 5, 2015.

(51) Int. Cl.
```
G02B 5/08      (2006.01)
G02B 7/18      (2006.01)
G02B 17/00     (2006.01)
G01V 7/00      (2006.01)
```

(52) U.S. Cl.
CPC .............. *G02B 7/181* (2013.01); *G01V 7/005* (2013.01); *G02B 5/0825* (2013.01); *G02B 17/004* (2013.01)

(58) Field of Classification Search
CPC . G02B 6/00; G02B 6/26; G02B 6/262; G02B 7/181; G02B 17/004; G02B 5/0825; G02B 5/28; G02B 5/288; G02B 5/0816; G02B 5/08; G02B 6/107; G02B 6/12007; H01L 33/60; Y10T 29/49826
USPC ........................................................ 359/862
See application file for complete search history.

(56) References Cited

U.S. PATENT DOCUMENTS

2014/0063606 A1*  3/2014  Aspelmeyer ......... G02B 5/0833
                                                                  359/584

\* cited by examiner

*Primary Examiner* — Euncha Cherry
(74) *Attorney, Agent, or Firm* — Bond Schoeneck & King, PLLC; David Nocilly; George McGuire

(57) ABSTRACT

A stable single-carrier optical spring, comprising a pair of dielectric mirrors, each having a dielectric coating, and positioned to form a standing wave from an incident optic field. The dielectric coating has a plurality of layers, where at least the first layer is sized to be an odd multiple of half a wavelength of the laser beam, to feature an opposite-sign photo-thermal effect due to the detailed interaction of the optical field with the coating. This results in an opposite-sign photo-thermal effect at the optical spring frequency. The dampening effect is large enough to stabilize the radiation pressure based optical spring, resulting in a statically and dynamically stable optical spring. As a result this coating allows stable locking of a cavity with a single laser frequency using radiation pressure feedback.

20 Claims, 6 Drawing Sheets

OPTICAL COATING PERMITTING CAVITY SELF-LOCKING

CROSS-REFERENCE TO RELATED APPLICATIONS

This application claims priority to U.S. Provisional No. 62/171,663, filed on Jun. 5, 2015.

STATEMENT REGARDING FEDERALLY SPONSORED RESEARCH OR DEVELOPMENT

This invention was made with government support under Grant Nos. 1068809 and 1352511 awarded by the National Science Foundation (NSF). The government has certain rights in the invention

FIELD OF THE INVENTION

The present invention relates to optical cavities, and, more particularly, to a detuned single-carrier optical cavity creating a statically and dynamically stable optical spring.

BACKGROUND

The Advanced Laser Interferometer Gravitational-Wave Observatory (aLIGO), together with its international partners Virgo and KAGRA, aim to directly observe gravitational waves emitted by astrophysical sources such as coalescencing of black hole and neutron star binary systems. The installation of the Advanced LIGO detectors is completed, and commissioning towards the first observation run is ongoing. Preliminary astrophysical data is expected in 2015. The sensitivity of those advanced gravitational-wave detectors in the observation band is limited by the quantum noise of light and the thermal noise associated with mirror coatings. A contributor to the thermal noise, expected to dominate in future cryogenic gravitational-wave detectors, is thermo-optic noise. It is caused by dissipation through thermal diffusion. The same physics also leads to an intensity noise coupling, known in art literature as photo-thermal effect.

The desire to lower the quantum noise in the gravitational-wave observation band has driven the power circulating in the Advanced LIGO arm cavities up to about 800 kW. The high laser power, in turn, couples the angular suspension modes of the two cavity mirrors. This Sidles-Sigg instability creates a soft (unstable) and a hard mode, whose frequency increases with the intra-cavity power. The detector's angular control system must control the soft and damp the hard mode, and at the same time must not contaminate the observation band, starting at 10 Hz in the case of Advanced LIGO.

Future gravitational wave detectors aim to extend the observational band to even lower frequencies, further aggravating this limitation. A model to overcome the angular instabilities has been proposed, based on a dual-carrier optical spring scheme demonstrated by the LIGO laboratory. The proposed angular trap setup uses two dual-carrier beams to illuminate two suspended optical cavities which share a single end mirror. However, the proposed angular trap set up suffers from instability as a result of the photo-thermal feedback. Accordingly, there exists a need in the art for a single-carrier optical spring that will not suffer from instability as a result of photo-thermal feedback.

SUMMARY

The present invention comprises a stable single-carrier optical spring. In some embodiments, the single-carrier optical spring comprises a pair of suspended dielectric mirrors, or other mechanical resonators, each having a reflective dielectric coating. The optical spring further comprises a laser or other source of a coherent electromagnetic wave, positioned to direct a single-frequency beam onto one of the mirrors. Wherein, the mirrors are positioned, spaced, and configured to form a standing wave from the incident beam. Furthermore, the dielectric coating comprises a plurality of layers, wherein at least the first layer is increased in thickness, and sized to be an odd multiple of half a wavelength of the beam, to feature an opposite-sign photo-thermal effect due to the detailed interaction of the optical field with the coating. This results in an opposite-sign photo-thermal effect at the optical spring frequency. The dampening effect is large enough to stabilize the radiation pressure based optical spring. As a result this coating allows stable locking of a cavity with a single laser frequency using radiation pressure feedback.

The invention may be used in a wide variety of applications involving interferometry. Applications may include, but are not limited to passively locking optical cavities for precision measurement applications, such as laser gyroscopes, acceleration sensors, sensing of quantum-limited mechanical oscillators in general, and generation of non-classical light through ponderomotive squeezing. It may also be used to dampen unwanted opto-mechanical resonances in precision interferometry related applications.

BRIEF DESCRIPTION OF THE DRAWINGS

Other advantages will be apparent from the accompanying figures and Detailed Description.

DETAILED DESCRIPTION OF THE VARIOUS EMBODIMENTS

Figure 1:
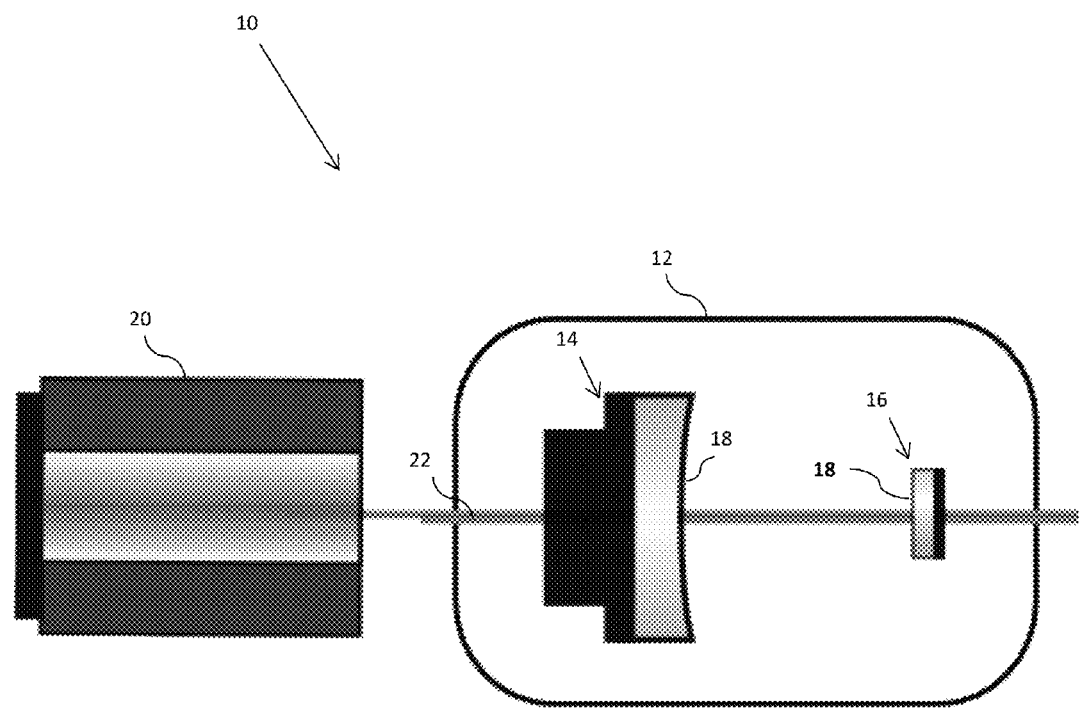
FIG. 1 shows a schematic according to an embodiment.

Referring now to the drawings wherein like reference numerals refer to like parts throughout, there is seen in FIG. 1 a system 10, that includes a detuned self-locking optical cavity 12 capable of creating a statically stable optical spring, using only a single laser frequency. As shown in FIG. 1, according to an embodiment, optical cavity 12 may comprise two dielectric mirrors, 14, 16 each having a reflective surface formed from a dielectric coating 18. In an exemplary embodiment, each mirror 14, 16 may be positioned with the reflective portions facing each other. System 10 may further include a laser, which is positioned to illuminate at least one of mirrors 14, 16. One of ordinary skill will appreciate, in conjunction with a review of this disclosure, that optical cavity may be further defined by additional dielectric mirrors or optical lenses. Laser 20 may be configured to generate a single-frequency beam 22. For example, some applications such as laser ring gyros may require multi-mirror cavities.

Once illuminated, the mirrors 14, 16 are oriented, spaced, and curved (which may include an embodiment where neither mirror surface is curved, or an embodiment where only one surface is curved) to form one or more standing waves from the single-frequency beam produced by laser 20. In the embodiment shown in FIG. 1, mirrors 14, 16 may comprise an input mirror 14, and end mirror 16. Input mirror 14 may be configured to receive, via the non-reflective surface, a laser beam 22, and to transmit the beam 22 out the reflective surface to the end mirror 16. Each mirror 14, 16, may be suspended or otherwise disposed to form an optical spring in response to the radiation exhibited by beam 22. In an exemplary embodiment, input mirror 14 may be configured to be a mechanical oscillator. For example, input mirror 14 may be suspended, or otherwise configured, as a single-stage or multi-stage pendulum or other mechanical resonator (such as a cantilever), and have a large enough mass to be effectively insensitive to radiation pressure exhibited by beam 22. End mirror 16 may be suspended, or otherwise configured, as a single or multi-stage pendulum or other mechanical resonator (such as a cantilever), and have a mass such that it may freely move in response to radiation pressure exhibited by beam 22. Moreover, one of ordinary skill in the art will appreciate that optical cavity may take on a variety of forms consistent with an optical spring, and remain within the scope of this disclosure.

For example, optical cavity 12 may be formed from mirrors 14, 16 suspended in a vacuum chamber, each with radius of curvature RoCa=5 cm and power transmissivity T=4.18×10-4. The measured finesse may be 7500±250 with a cavity length of L0=7.0±0.2 cm. A short cavity may be used to minimize frequency noise coupling. The cavity 12 may have a free spectral range (FSR) of about 2.14 GHz and cavity pole fpole=γ/(2π)=143 kHz. Input mirror 14 may have a mass off 300 g, designed to be heavy to make be insensitive to radiation pressure; and suspended as a single stage pendulum with mechanical resonances, i.e. position, pitch and yaw, close to 1 Hz. End mirror 14 may have a mass of 0.41±0.01 g and be 7.75 mm in diameter. End mirror 16 may be suspended with three glass fibers from a 300 g steel ring. The steel ring may have a diameter of 7.6 cm and be itself suspended. In this way, the end mirror may be free to move in the glass suspension at about its resonance frequency of 18 Hz, and is only subject to the optical spring radiation pressure.

In an exemplary embodiment, coating 18 may be formed from a plurality of layers of a dielectric material. The dielectric material may be comprised of dielectrics, such as Ta2:SiO2, or AlXGa1-x as are known to be advantageous for forming a dielectric mirror. Each layer of coating 16, or a predetermined number of layers, may have a thickness configured to feature an opposite-sign photo-thermal effect due to the detailed interaction of the optical field with coating 18, resulting in an opposite-sign photo-thermal effect at the optical spring frequency. In an exemplary embodiment, the first layer may be increased in thickness and sized to be an odd multiple of half a wavelength of beam 22. Changing the sign of the feed-back path may be exploited to stabilize and otherwise unstable optical spring. As a result, coating 16 allows stable locking of a cavity with a single laser frequency using radiation pressure feed-back. One of ordinary skill will appreciate, in conjunction with a review of this disclosure that, for embodiments including multi-mirror cavities, only some of the mirrors may include the modified coatings as described above.

Figure 2:
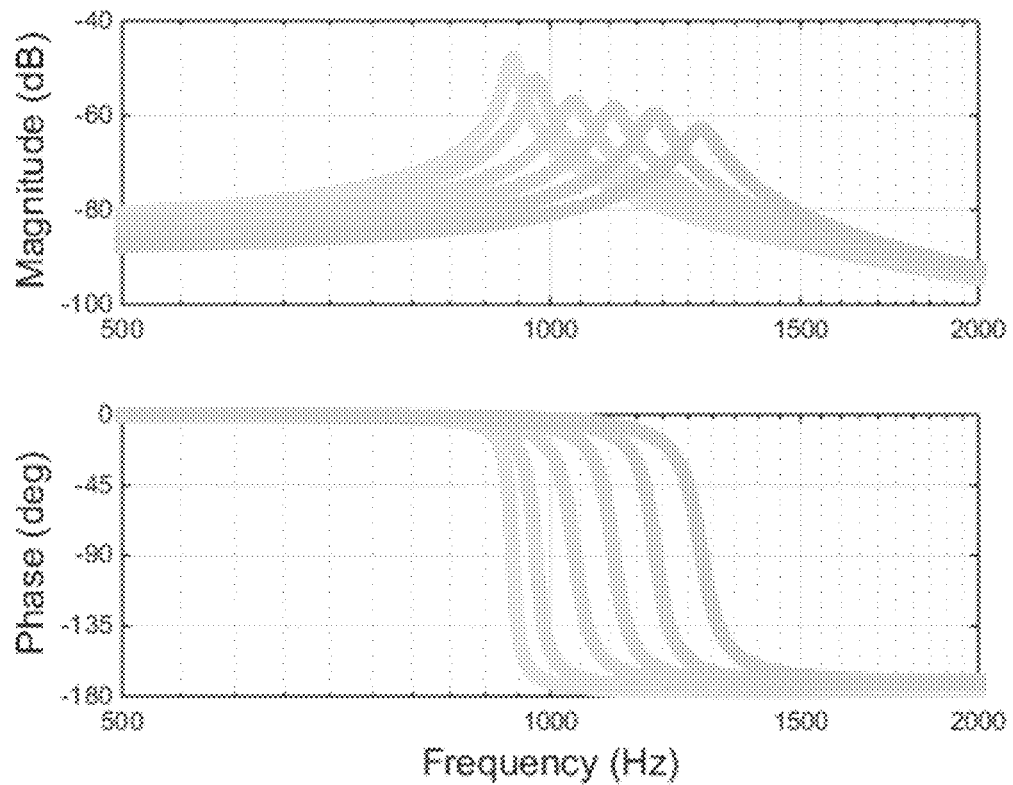
FIG. 2 shows a graph according to an embodiment.

FIG. 2 shows the transfer functions of an optical spring, with varying thickness of the first layer of coating 18. More particularly, FIG. 2 depicts the effect of increasing the first SiO$_2$ coating layer from 0.5 wavelength to 20.5 wavelength of beam 16. As shown, the sign of the photothermal transfer function switches at increasingly lower frequencies as the thickness of the first layer of coating 18 increases by odd multiples of a wavelength of beam 22. Although FIG. 2 shows the effect of modifying the first layer of dielectric coating 18, one of ordinary skill in the art will recognize that the thicknesses of other layers may also be altered. At frequencies around 100 kHz, the thermal diffusion length only affects the first few layers of the coating. Thus, the first few layers of coating 18 affect the overall coating 18 reflected phase differently than the rest of the coating 18. This modified coating thus may be used to stabilize and otherwise unstable optical spring, and allows the detuned self-locking of an optical cavity, using just one laser frequency.

The above-described sign-change of the photothermal transfer function may be calculated according to the following. We are interested in the photothermal transfer function from the absorbed surface intensity j to effective mirror displacement $\Delta z$, i.e. the mirror position as read out by a laser beam. In the limit where the coating thickness $d_{coat}$ is negligible compared to the diffusion length $d_{diff}$ and transverse diffusion is irrelevant, $d_{coat} \ll d_{diff} \ll w$, with w being the Gaussian beam radius, the one-dimensional heat diffusion equation may be solved as:

$$\ddot{z}j(z) + \rho C \dot{T}(z) = 0 \quad (1)$$

with the boundary conditions $j(\infty)=0$, and $j(0)=j$, the absorbed surface intensity. The mirror displacement $\Delta z$, and therefore the photothermal transfer function takes the form In general, the photothermal transfer function takes the form:

$$\Delta z = \bar{a} \int_0^\infty T dz = \bar{a} \frac{j}{i\omega\rho C}. \quad (2)$$

where $d_{diff}=\sqrt{\kappa/(\rho C \omega)}$ is the diffusion length in the substrate, with $\kappa$, C and $\rho$ being the thermal conductivity, heat capacity and density of the material. $\omega$ and j are the observation frequency and the absorbed surface intensity. Finally, $\bar{\alpha}=2(1+\sigma)\alpha$ is the effective expansion coefficient under the mechanical constraint that the heated spot is part of a much larger optic. $\alpha$ and $\sigma$ are the regular linear expansion coefficient and the Poisson ratio. This may be expanded to include the effect of transverse diffusion as:

$$I(\Omega) = \frac{1}{\pi} \int_0^\infty du \int_{-\infty}^\infty dv \frac{u^2 e^{-u^2/2}}{(u^2+v^2)\left(1+\frac{(u^2+v^2)}{i\Omega}\right)}. \quad (3)$$

with $\Omega=\omega C\rho w2/(2\kappa)$. As expected, for $\Omega \gg 1$, the correction factor becomes $I(\Omega) \approx 1$.

To calculate the effect of a dielectric coating on the photothermal transfer function the response of the coating reflected phase to temperature fluctuations at each layer must be found, and the heat diffusion equation solved. If the detailed coating structure and transverse diffusion are included, the full photothermal transfer function will result. However, dielectric optical coatings require that the spot size w is much bigger than the coating thickness $d_{coat}$—otherwise the plane wave approximation inside the coating is not justified. Since the frequency dependent diffusion length $d_{diff}$ is the relevant scale parameter for both coating effects and transverse diffusion effects, and since the limit $d_{coat} \ll d_{diff} \ll w$ results in the simple expression from Eq. (2), the corrections due to transverse diffusion and the corrections due to the coating structure will never be big at the same time. Furthermore, expanding the heat diffusion equation as Taylor series shows that to first order one can simply calculate both effects as multiplicative corrections. Thus for the following calculation I can ignore any transverse heat diffusion without loss of generality.

The response of the coating reflected phase to temperature fluctuations may be calculated at each coating layer. Following the notation of "Thermo-Optic Noise in Coated Mirrors for High-Precision Optical Measurements," Phys. Rev. D 78. 102003 (2008) (herein incorporated by reference in its entirety), the change $\Delta\phi k$ in the optical round trip phase in coating layer k due to temperature fluctuations is given by the following integral across layer k:

$$\Delta\phi_k = \frac{4\pi}{\lambda_0} \int_k (\beta_k + \bar{\alpha}_k n_k) T(z) dz, \quad (4)$$

where $\bar{\alpha}k$ is the effective expansion coefficient under the mechanical constraint from the coating being attached to a substrate, as discussed in "Thermo-Optic Noise":

$$\bar{\alpha}_k = \alpha_k \frac{1+\sigma_s}{1-\sigma_k}\left[\frac{1+\sigma_k}{1+\sigma_s} + (1-2\sigma_s)\frac{E_k}{E_s}\right]. \quad (5)$$

Ek, Es, σk and σs are the Young's moduli and Poisson ratio for layer k and the substrate. If the coating layers have similar elastic properties this becomes $\bar{\alpha}k \approx 2(1+\sigma)\alpha k$.

The coupling of $\Delta\phi k$ to the phase of the light reflected of the coating $\Delta\phi c$ is given by $$\frac{\partial \phi_c}{\partial \phi_k} = \text{Im} \frac{1}{r} \frac{\partial r}{\partial \phi_k}, \quad (6)$$

where r is the complex field reflectivity of the coating. In Thermo-Optic Noise a recursive expression for these partial derivatives is given, and they are shown to be negative for quarter wavelength coatings. Appendix A gives an alternate approach to calculating them.

Additionally all layers and the substrate also contribute to the total expansion of the mirror. If I set ▓=0 and include the substrate in the summation, the total change of the coating reflected phase $\Delta\phi c$ becomes $$\Delta\phi_c = \frac{4\pi}{\lambda_0} \int_0^\infty \left[\frac{\partial \phi_c}{\partial \phi_k}(\beta_k + \bar{\alpha}_k n_k) + \bar{\alpha}_k\right] T(z) dz, \quad (7)$$

where the material parameters in the brackets are evaluated for the layer k that contains the volume element at depth z.

Next, one-dimensional heat diffusion equation across the coating may be solved. For simplifying the derivation it may be assumed that all heat is deposited on the first interface layer. (however, it should be noted that the field likely penetrates a couple layers into the coating). Extending the analysis to bulk absorption is briefly discussed at the end of Appendix B, and results in a small change to Eqs. (8)-(10). I now define $\xi_k = \sqrt{I\omega C_k \rho_k / \kappa_k}$ for every layer k. Inside this layer the heat diffusion equation is $\xi_k^2 = T^R$, where the notation $' = \neq z$ is used. This has the solution $$T(z) = T_R e^{-\xi_k(z-z_0)} + T_L e^{\xi_k(z-z_0)}, \quad (8)$$

where $T_R$ and $T_L$ are the right-propagating and left-propagating mode amplitudes at $z = z_0$. The solution for the temperature profile across the whole coating can now be found by matching the boundary conditions. Specifically, T and $j = -\hat{e}_k \nabla T$ are continuous across coating boundaries, and j at the surface is equal to the external heating power. A solution is given in Appendix B.

To evaluate Eq. (7) the temperature integral across every layer k is needed. It can be expressed as a function of the temperature in the middle of the layer:

$$\bar{T}_k d_k := \int_{-d_k/2}^{d_k/2} T(z) dz = \frac{2}{\xi_k} \sinh\left(\frac{\xi_k}{2} d_k\right)(T_R + T_L)_{middle}. \quad (9)$$

Similarly, for the substrate the following may be defined:

$$\bar{T}_s d_s := \int_0^\infty T(z) dz = \frac{T_{R,s}}{\xi_s}, \quad (10)$$

where $T_{R,s}$ is the temperature at the coating-substrate interface. The total change of the effective mirror position thus becomes $$\Delta z = \sum_k \left[\frac{\partial \phi_c}{\partial \phi_k}(\beta_k + \bar{\alpha}_k n_k) + \bar{\alpha}_k\right]\bar{T}_k d_k, \quad (11)$$

where the sum goes over all layers plus the substrate, and I used $\ddot{A}\phi_c = 4\delta \ddot{A}z/\ddot{e}_0$. The bracket in Eq. (11) is negative and relatively large for the first few layers of the coating, and becomes positive closer to the substrate.

Now all the pieces for calculating the photothermal transfer function are in place. Each may frequency may be independently evaluated: (i) Given the surface heating j, the temperature profile across the coating is calculated. In particular I am interested in the temperatures in the middle of the coating layers, given by Eq. (B9). (ii) I calculate the partial derivatives ▓ using Eq. (A8) to get the sensitivity of the coating to round trip phase changes in each layer. (iii) I can now evaluate Eq. (11) to find the effective mirror displacement $\Delta z$. The ratio $\Delta z / j$ is the photothermal transfer function.

At low frequencies ($d_{coat} \ll d_{diff}$) the temperature fluctuations will reach far into the substrate. Thus only the substrate term in Eq. (11) will be relevant, and Eq. (2) is recovered. On the other hand, for frequencies with $d_{diff}$ smaller than $d_{coat}$, the negative bracket in Eq. (11) for the first few coating layers results in an enhancement and a sign change of the transfer function, as will be set out in concrete examples below.

Example 1

Figure 3:
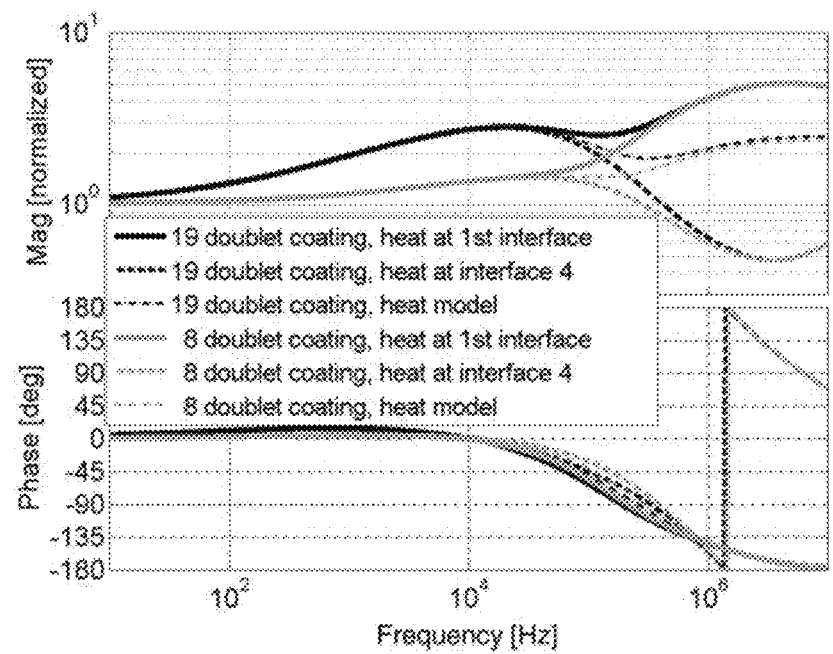
FIG. 3 shows a graph according to an embodiment.

For example, the photothermal transfer function with a quarter-wave $Ta_2O_5$:$SiO_2$ coating, heated at the coating surface, may be evaluated. FIG. 3 shows a bode plot of the photothermal transfer function correction factor for $Ta_2O_5$:$SiO_2$ coating. The black (gray) traces are for a 19-doublet (eight-doublet) coating, corresponding, to an Advanced LIGO end (input) test mass coating. For the solid traces the heat was deposited at the front surface of the coating. For the dashed traces it was deposited at the fourth interface layer, at a depth of 0.68 μm. Finally, for the dash-dotted traces, the power was deposited in the coating according to the optical power present in each layer. At high frequencies the transfer function strongly depends on heat deposition depth, which in turn can be exploited to measure the absorption depth. To get the full transfer function multiply with Eq. (2). The calculation is based on the parameters from Table I.

The Advanced LIGO end and input test masses are coated with a titanium-doped $Ta_2O_5:SiO_2$ coating with 19 and eight doublet layers, respectively. For clarity, the expectation from Eq. (2) may be divided out, and the beam spot size dependence from Eq. (3) may be ignored. Note that for the case of Advanced LIGO (w=6 cm) this is a good approximation. Even at the lower edge of the Advanced LIGO observation band (10 Hz) the normalized frequency Ũ from Eq. (3) is already $1.3 \times 10^5$ and transverse diffusion is not important. The correction factor arising from the coating structure is shown in FIG. 3 for both coatings (black and gray solid traces). As expected a gradual sign change and increase in magnitude is occurring around about 100 kHz. The correction factor however has a tail that extends to relatively low frequencies, reaching 3 dB at 160 Hz and 6 dB at 1 kHz for the 19-doublet coating. Note that the high frequency feature significantly depends on the depth at which the heat is deposited, while the same is not true for the low frequency tail. To illustrate this point FIG. 3 shows two additional traces for each coating. The dashed traces correspond to transfer functions for which the heat was deposited at a depth of 0.68 μm, that is at the fourth interface layer (the beginning of the second high-index layer).

TABLE I

Parameters for fused silica ($SiO_2$) and tantalum pentoxy ($Ta_2O_5$).
The values are taken from [9]-[17].

| Parameters $Ta_2O_5:SiO_2$ | Symbol | $SiO_2$ | $Ta_2O_5$ | Unit |
|---|---|---|---|---|
| Refractive index (@ 1064 nm) | n | 1.45 | 2.06 | . . . |
| Specific heat | C | 746 | 306 | J/kg/K |
| Density | ρ | 2200 | 6850 | kg/m³ |
| Thermal conductivity | κ | 1.38 | 33 | W/m/K |
| Thermal expansion coefficient | α | 0.51 | 3.6 | ppm/K |
| Thermo-optic coefficient (1 μm) | $\beta = \frac{dn}{dT}$ | 8 | 14 | ppm/k |
| Poisson ratio | σ | 0.17 | 0.23 | . . . |
| Youngs modulus | E | 72.80 | 140 | GPa |

The dash-dotted traces correspond to a model in which the power absorbed in each layer is proportional to the optical power circulation at that depth. This is a realistic absorption model if the absorption is not dominated by surface contamination. If all the heat is deposited at the sixth interface layer or deeper (not shown in FIG. 1), the sign change or phase wrapping at higher frequencies that is seen in all traces in FIG. 1 will disappear. The photothermal effect is then dominated by simple material expansion at all frequencies.

Therefore it may be noted that at high frequencies the transfer function is a sensitive function of the heat deposition depth. This effect could also be exploited to measure the depth at which the optical absorption in the coating occurs. This approach could be a powerful diagnostic tool to distinguish intrinsic absorption inside the coating from contamination on the coating surface.

Example 2

Figure 4:
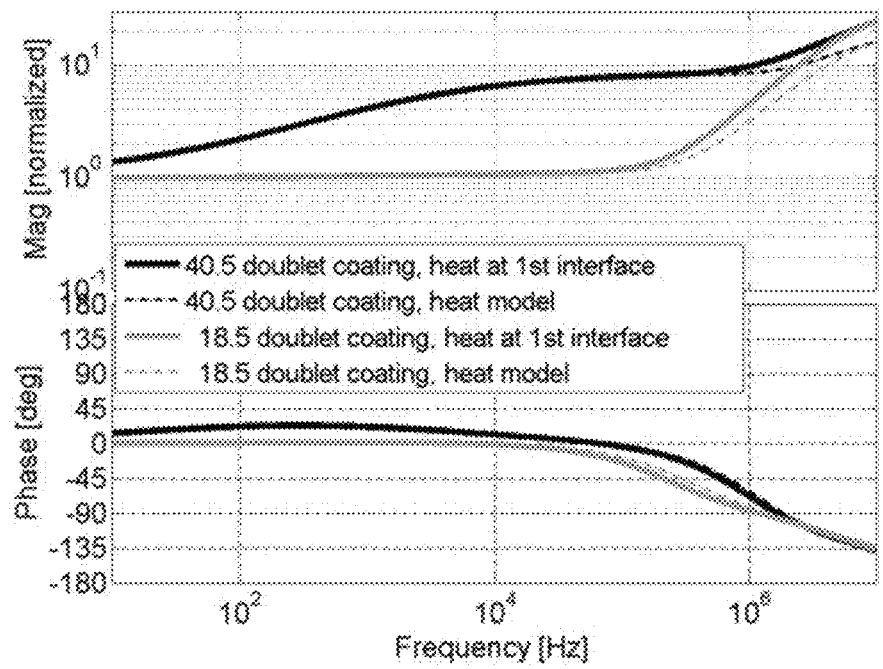
FIG. 4 shows a graph according to an embodiment.

Next, FIG. 2 shows the photothermal transfer function correction factor for the crystalline. $GaAs:Al_{0.92}Ga_{0.08}As$. More particularly, FIG. 4 shows a bode plot of the photothermal transfer function correction factor for a $GaAs:Al_{0.92}Ga_{0.08}As$ coating with 40.5 and 18.5λ/4 doublets (black and gray). For the solid traces the heat was deposited at the front surface of the coating. For the dash-dotted traces, the power was deposited in the coating according to the optical power present in each layer. To get the full transfer function multiply with Eq. (2). The calculation is based on the parameters from Table II. Shown in black and gray are traces for coatings with 40.5 and 18.5 ë/4 doublets respectively. They correspond to power reflectivities of (1-2.5 ppm) and 0.9976. Due to the higher heat conductivity of the crystalline coating the transfer function is much less dependent on the absorption depth. The flatness of the 18.5 doublet photothermal transfer function implies that the coating has no influence on the total photothermal effect, i.e. the substrate photothermal effect acquires no correction due to the coating. This is a sign of the cancellation effect between thermal expansion and index of refraction change that naturally occurs for this particular coating. As shown below this leads to a significant thermo-optic noise cancellation.

There are several implications worth discussing here. First this calculation predicts a small change in the expected intensity noise coupling in the observation band of gravitational-wave detectors. The Advanced LIGO mirrors are expected to have a coating absorption coefficient of less than 1 ppm, which should keep photothermal shot noise below the design quantum noise. The effect would be more important for any compensation system for thermal lensing that relies on projecting a heating pattern onto the surface of a test optic. This is currently not planned for Advanced LIGO exactly because of the photothermal effect. Comparing $GaAs:Al_{0.92}Ga_{0.08}As$ coatings to $Ta_2O_5:SiO_2$ coatings, the influence of the coating onto the photothermal transfer function is nominally slightly larger in the gravitational-wave observation band. However the higher thermal conductivity tends to equalize the temperature fluctuations across the whole coating, making it easier to design a coating for which the photothermal effect cancels across a wide band.

The photothermal effect is also important for any opto-mechanical feedback system, as it tends to dominate over the radiation pressure at higher frequencies. Due to the cavity response time, radiation pressure-based single-carrier optical spring systems are either statically or dynamically unstable. A second optical carrier is often needed to get stable optical feedback. The photothermal effect due to residual absorption will slightly change the phase of the optical spring. Indeed, the first-order effect given in Eq. (2) will always drive the optical spring towards

TABLE II

Parameters for a $GaAs:Al_{0.92}Ga_{0.08}As$ crystalline coating
The values are taken from [12,18].

| Parameters $Al_xGa_{1-x}As$ | Symbol | x = 0 | x = 0.92 | Unit |
|---|---|---|---|---|
| Refractive index (@ 1064 nm) | n | 3.48 | 2.977 | . . . |
| Specific heat | C | 330 | 440 | J/kg/K |
| Density | ρ | 5320 | 3880 | kg/m³ |
| Thermal conductivity | κ | 55 | 77 | W/m/K |
| Thermal expansion coefficient | α | 5.7 | 5.2 | ppm/K |
| Thermo-optic coefficient (1 μm) | $\beta = \frac{dn}{dT}$ | 366 | 179 | ppm/k |
| Poisson ratio | σ | 0.31 | 0.40 | . . . |
| Youngs modulus | E | 85.3 | 83.3 | GPa | instability. If however, as discussed above, the optical spring has a resonance frequency where the photothermal effect changes sign, the photothermal effect will tend to stabilize the optical spring. The additional photothermal feedback can indeed overcome the feedback delay due to the cavity response time, and lead to a cavity self-locking effect. This holds even for a single-carrier optical spring.

Next, the fluctuation-dissipation theorem may be applied to thermorefractive noise calculation. We are interested in the thermal noise seen by one specific degree of freedom, such as the mirror displacement Äz read out by a laser beam. Äz is a linear function of the temperature field in the optic:

$$\Delta z = \int dV q(r,z) \delta T(r,z). \tag{12}$$

The thermal noise seen by this degree of freedom is proportional to the dissipated power per cycle if we inject an entropy with the same spatial profile q(r, z). For the calculation of the photothermal transfer function we had to solve the heat diffusion equation and found the full heat flow field in the optic as a by-product (Appendix B). This directly permits calculating the dissipated power. Taking into account the full details of the coating we can thus use the same approach to calculate the thermo-optic noise, that is the coupling of temperature fluctuations due to the combined effect of thermal expansion (thermoelastic noise) and change in index of refraction (thermorefractive noise). More details on the thermal noise calculation is given in Appendix C.

Figure 5:
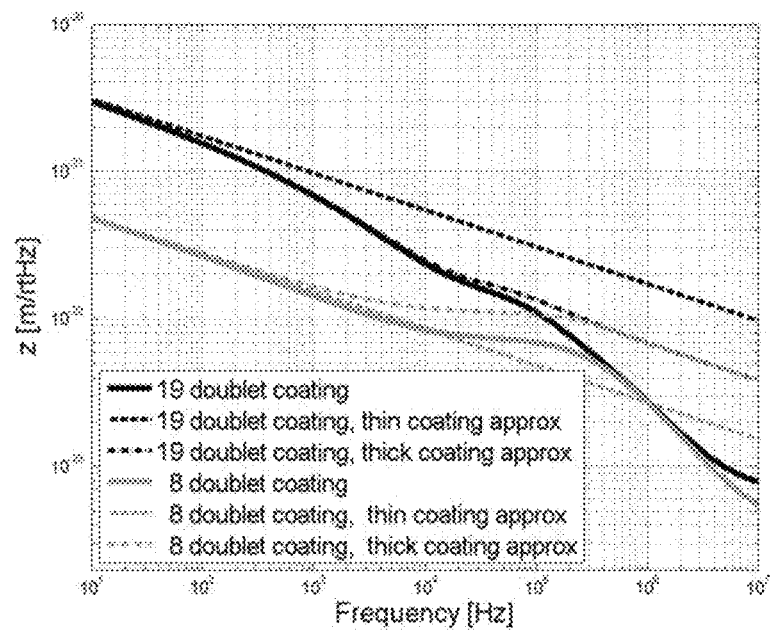
FIG. 5 shows a graph according to an embodiment.

In "Thermo-Optic Noise" approximations were given for both a thin-coating limit and a thick-coating extension that describe the correlation of thermoelastic and thermorefractive noise as a function of coating thickness. This thick-coating extension is a good approximation for the observation band of Advanced LIGO. However, coating-averaged material properties were used for solving the thermal diffusion equation. That approximation will break down at higher frequencies, and solving the full heat diffusion equation becomes necessary for calculating the high frequency thermo-optic noise. The result for a $Ta_2O_5$:$SiO_2$ coatings is shown in FIG. 5, again for a 19-doublet and an eight-doublet coating (black and gray). The solid trace is based on the full heat flow calculation in the coating. The dashed and dash-dotted traces are the thin and thick coating approximations discussed in "Thermo-Optic Noise". The calculation is based on the parameters from Table I and a beam spot size of w=6 cm. Below 1 kHz the former agrees well with the thick-coating approximation, while the latter is better represented by the thin-coating approximation. Above about 10 kHz both approximations break down.

Figure 6:
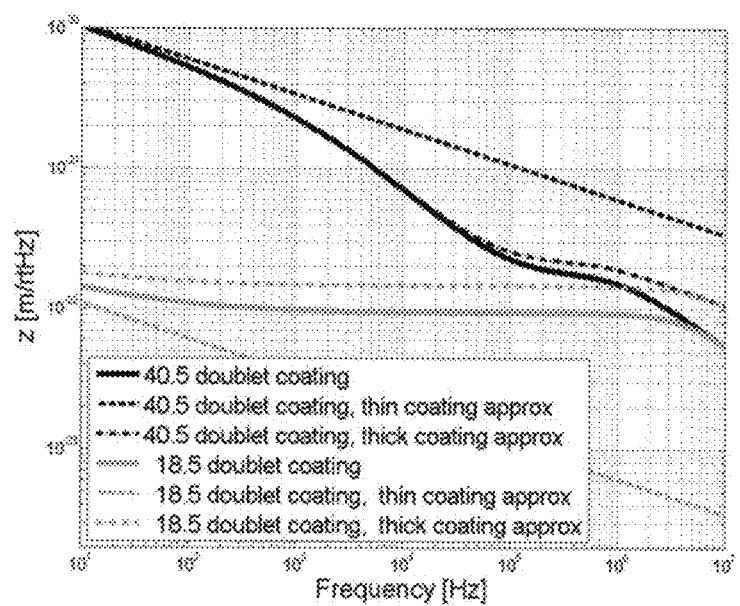
FIG. 6 shows a graph according to an embodiment.

Finally, FIG. 6 shows the thermo-optic noise of the two GaAs:$Al_{0.92}Ga_{0.08}$As coatings discussed in this paper. As shown, the thermo-optic noise of a GaAs:Al0.92Ga0.08As coating with 40.5 and 18.5λ/4 doublets (black and gray), corresponding to power reflectivities of (1-2.5 ppm) and 0.9976. The solid trace is based on the full heat flow calculation in the coating. The dashed and dash-dotted traces are again the thin and thick coating approximations discussed in "Thermo-Optic Noise", applied to the crystalline coating. A cancellation of the noise coupling naturally occurs for a 18.5 layer doublet, but can be engineered for higher reflectivity coatings by deviating from the simple λ/4 structure. The calculation is based on the parameters from Table II and a beam spot size of w=6 cm. The cancellation effect that naturally occurs for the 18.5 doublet coating results in a thermal noise at 100 Hz fifty times below the one of the 40.5 doublet coating. By deviating from a simple ë/4 design such a cancellation effect can also be achieved for coating with higher reflectivities. The thick-coating approximation from "Thermo-Optic Noise" provides good results for the 40.5 doublet coating in the gravitational-wave observation band below about 2 kHz. However none of the approximations is particularly useful for the 18.5 doublet, suggesting that estimating the extent to which a thermo-optic noise cancellation can be achieved requires the detailed heat flow analysis done in this paper.

Appendix A: Coating Reflectivity

The partial derivatives of the coating reflectivity with respect to the round trip phase in coating layer k are now shown. For a dielectric stack with N layers, each layer with index of refraction $n_k$, thickness $d_k$ and round trip phase $\phi k = 4\delta n_k d_k/\ddot{e}_0$, I can define right- and left-travelling modes $\Psi^R$ and $\Psi^L$ at every interface. It is assumed that the light is incident from the left towards the coating at z=0, and find the transfer matrix relation $$\begin{pmatrix} \Psi^K \\ \Psi^L \end{pmatrix}_{k+1} = Q_k D_k \begin{pmatrix} \Psi^K \\ \Psi^L \end{pmatrix}; \tag{A1}$$

where $$D_k = \begin{pmatrix} e^{-i\phi_k/2} & 0 \\ 0 & e^{i\phi_k/2} \end{pmatrix} \tag{A2}$$

is the propagator through the layer and $$Q_k = \frac{1}{2n_{k+1}} \begin{pmatrix} n_{k+1}+n_k & n_{k+1}-n_k \\ n_{k+1}-n_k & n_{k+1}+n_k \end{pmatrix} \tag{A3}$$

is the transition matrix from layer k to layer k to k+1. The transfer matrix for the total coating is $$M = Q_N D_N \ldots Q_k D_k \ldots Q_k D_k Q_0, \tag{A4}$$

with $Q_0$ being the transition matrix from vacuum to layer 1. M is related to coating reflectivity r and transmission t by $$M \begin{pmatrix} 1 \\ r \end{pmatrix} = \begin{pmatrix} t \\ 0 \end{pmatrix}, \tag{A5}$$

which can easily be solved for the reflectivity r. The derivative of r is required with respect to the round trip phase in layer k. Thus:

$$\frac{\partial M}{\partial \phi_k} = Q_N D_N \ldots Q_k D_k \begin{pmatrix} -i/2 & 0 \\ 0 & i/2 \end{pmatrix} Q_{k-1} D_{k-1} \ldots Q_1 D_1 Q_0. \tag{A6}$$

Using the chain rule on Eq. (A5):

$$\frac{1}{r}\frac{\partial r}{\partial \phi_k} = \frac{1}{M_{21}}\frac{\partial M_{21}}{\partial \phi_k} - \frac{1}{M_{22}}\frac{\partial M_{22}}{\partial \phi_k}, \tag{A7}$$

which can be used directly in Eq. (6), and:

$$\frac{\partial \phi_c}{\partial \phi_k} = \text{Im}\left(\frac{1}{M_{21}}\frac{\partial M_{21}}{\partial \phi_k} - \frac{1}{M_{22}}\frac{\partial M_{22}}{\partial \phi_k}\right). \tag{A8}$$

Appendix B: Coating Heat Diffusion

Here the solution to the one-dimensional heat diffusion equation $\xi_k^2 T = T^\alpha$ across the whole coating and substrate is given. As discussed in the main text, the heat j is assumed to be deposited on the first interface layer.

The boundary conditions require that T and $j=-\kappa_k \nabla T$ are continuous everywhere. In each layer we have $\sqrt{i\Omega C_k \rho_k/\kappa_k}$, and the solution has the form given in Eq. (8). At $z=z_0$ the heat flow j and temperature T are related to $T_R$ and $T_L$ via $$\begin{pmatrix} j \\ T \end{pmatrix} = \begin{pmatrix} \kappa_k \xi_k & \\ & 1 \end{pmatrix}\begin{pmatrix} 1 & -1 \\ 1 & 1 \end{pmatrix}\begin{pmatrix} T_R \\ T_L \end{pmatrix}. \tag{B1}$$

The following may therefore be defined:

$$E_k = \begin{pmatrix} \kappa_k \xi_k & \\ & 1 \end{pmatrix}\begin{pmatrix} 1 & -1 \\ 1 & 1 \end{pmatrix}\begin{pmatrix} e^{-\xi_k \frac{d_k}{2}} & \\ & e^{\xi_k \frac{d_k}{2}} \end{pmatrix} \tag{B2}$$

and $$F_k = \begin{pmatrix} e^{-\xi_k \frac{d_k}{2}} & \\ & e^{\xi_k \frac{d_k}{2}} \end{pmatrix}\frac{1}{2}\begin{pmatrix} 1 & 1 \\ -1 & 1 \end{pmatrix}\begin{pmatrix} \frac{1}{\kappa_k \xi_k} & \\ & 1 \end{pmatrix}. \tag{B3}$$

The operator $D_k = E_k F_k$ propagates the heat flow and temperature field across the layer k:

$$\begin{pmatrix} j \\ T \end{pmatrix}_{k,k+1} = D_k \begin{pmatrix} j \\ T \end{pmatrix}_{k-1,k}, \tag{B4}$$

while $F_k$ reads out the temperature in the middle of the coating:

$$\begin{pmatrix} T_R \\ T_L \end{pmatrix}_{k,\text{middle}} = F_k \begin{pmatrix} j \\ T \end{pmatrix}_{k-1,k}. \tag{B5}$$

To fulfil the global boundary conditions, for the substrate may be defined as $$F_s = \frac{1}{2}\begin{pmatrix} 1 & 1 \\ -1 & 1 \end{pmatrix}\begin{pmatrix} \frac{1}{\xi_s \kappa_s} & \\ & 1 \end{pmatrix} \tag{B6}$$

and $$M = F_s D_N \ldots D_2 D_1$$

which fulfils $$M\begin{pmatrix} j \\ T \end{pmatrix}_{0,1} = \begin{pmatrix} T_R \\ 0 \end{pmatrix}_{N,s}, \tag{B8}$$

where the left-propagating mode is set to zero in the substrate to keep the temperature finite at plus infinity.

This can be solved for $T_{0,1}$. The temperature in the middle of each coating layer i becomes $$\begin{pmatrix} T_R \\ T_L \end{pmatrix}_{k,\text{middle}} = F_k D_{k-1} \ldots D_1 \begin{pmatrix} 1 \\ -\frac{M_{21}}{M_{22}} \end{pmatrix} j. \tag{B9}$$

Similarly Eq. (B8) directly gives us $T_{R,N,s}$. Both results can now be used in Eqs. (9)-(10).

The matrix formalism discussed here can also be extended to bulk heating. For this I use 3×3 matrices with the third row equal to (0,0,1). The field vectors are also extended to $$\begin{pmatrix} j \\ T \\ 1 \end{pmatrix} = \begin{pmatrix} \kappa_k \xi_k & -\kappa_k \xi_k & \\ 1 & 1 & \\ & & 1 \end{pmatrix}\begin{pmatrix} T_R \\ T_L \\ 1 \end{pmatrix}. \tag{B10}$$

The layer propagation matrices $D_k$ become $$D_k = \begin{pmatrix} \cosh \xi_k d_k & -\kappa_k \xi_k \sinh \xi_k d_k & \frac{p_k}{\xi_k}\sinh \xi_k d_k \\ -\frac{1}{\kappa_k \xi_k}\sinh \xi_k d_k & \cosh \xi_k d_k & -\frac{2p_k}{\kappa_k \xi_k^2}\sinh^2 \frac{\xi_k d_k}{2} \\ & & 1 \end{pmatrix} \tag{B11}$$

where $p_k$ is the bulk heating power density in layer k. For substrate heating the boundary conditions deserve some attention. Since it is nonadiabatic, the heat flow j should asymptote to zero, whereas the temperature will asymptote to the adiabatic value $T_{adi}=q_s/(\xi_k^2 \kappa_k)$. This extension was used for the thermal noise calculation in Appendix C.

Appendix C: Noise Calculation

For the thermo-optic noise the following may be calculated. According to the discussion in Sec. III the displacement fluctuations of the mirror as seen by a laser beam are given by $$\Delta z = \int_0^\infty dz \int d^2 r q(z) q(r) \delta T(r,z), \tag{C1}$$

with the readout functions $$q(r) = \frac{2}{\pi w^2} e^{-2\frac{r^2}{w^2}} \tag{C2}$$

normalized to $\int d^2 q(r) = 1$, and $$q(z) = \left[\frac{\partial \phi_c}{\partial \phi_k}(\beta_k + \bar{a}_k n_k) + \bar{a}_k\right]_{k(z)}, \tag{C3}$$

where the bracket is evaluated for the corresponding coating layer. In time domain the coating is now heated with the energy density $$\frac{dQ}{dV} = Tds = TF_0 \cos(\omega t) q(z) q(r) \Big].$$ (C4)

where s is the entropy per unit volume. $F_0$ is the entropy drive amplitude as introduced by Levin [11]. It will cancel in the final expression (C9). Switching back to frequency domain we find for the heating power per volume, p, $$p = i\omega \frac{dQ}{dV} = i\omega T F_0 q(z) q(r).$$ (C5)

The cycle-averaged dissipated power is $$W_{diss} = \frac{1}{T} \int dV \frac{|j(z,r)|^2}{2\kappa}.$$ (C6)

The factor of 2 in the denominator is required because we are working in Fourier domain and j(z, r) is complex. Since we again neglect radial diffusion, the radial dependence reduces to $$\int d^2 r q^2(r) = \frac{1}{\pi w^2},$$ (C7)

and we find for the cycle-averaged dissipated power $$W_{diss} = \frac{1}{2T\pi w^2} \int_0^\infty \frac{|j(z)|^2}{\kappa} dz.$$ (C8)

Given the bulk heating p from Eq. (C5) as input, we can use the approach laid out in Appendix B to calculate the last integral.

Finally, the thermo-optic power spectral density for the readout degree of freedom Δz is then given by $$S_{\delta T}(f) = \frac{8k_B T}{\omega^2} \frac{W_{diss}}{F_0^2}.$$ (C9)

What is claimed is:

1. A single-carrier optical spring, comprising:
a first dielectric mirror having a first dielectric coating comprising a first plurality of layers;
a second dielectric mirror having a second dielectric coating comprising a second plurality of layers, wherein the second dielectric mirror is positioned opposite the first dielectric mirror such that the second dielectric coating and first dielectric coating are facing and form an optical cavity between the first dielectric mirror and the second dielectric mirror, and such that a laser beam incident upon the first or second dielectric coating will resonate in the optical cavity formed by the dielectric mirrors,
wherein the first layer of the first plurality of layers and the first layer of the second plurality of layers is sized to be an odd multiple of half a wavelength of the incident laser beam.

2. The single carrier optical spring of claim 1, wherein the optical cavity is further formed by a third dielectric mirror or an optical lens.

3. The single-carrier optical spring of claim 1, wherein the sizes of the first layer of the first plurality of layers and the second plurality of layers are different.

4. The single carrier optical spring of claim 1, wherein the first dielectric mirror comprises a receiving surface opposite the first dielectric coating, wherein the first dielectric mirror is configured to receive the laser beam at the receiving surface and to transmit the laser beam from the first dielectric coating, such that the laser beam is incident upon the second dielectric mirror.

5. The single carrier optical spring of claim 1, wherein the first mirror is configured to be a mechanical oscillator.

6. The single carrier optical spring of claim 5, wherein the first mirror has a mass large enough to remain effectively stationary when subjected to radiation pressure from the incident laser beam.

7. The single carrier optical spring of claim 1, wherein the second mirror is configured to be a mechanical oscillator.

8. The single carrier optical spring of claim 7, wherein the second mirror has a mass small enough to move in response to radiation pressure exhibited by the incident laser beam.

9. The single carrier optical spring of claim 5, wherein the first dielectric mirror is suspended as a single or multi-stage pendulum.

10. The single carrier optical spring of claim 7, wherein the second dielectric mirror is suspended as a single or multi-stage pendulum.

11. The single carrier optical spring of claim 1, further comprising a laser configured to generate the incident laser beam.

12. A method of providing cavity self-locking, comprising the steps of:
providing a first dielectric mirror having a first dielectric coating comprising a first plurality of layers and a second dielectric mirror having a second dielectric coating comprising a second plurality of layers, wherein the second dielectric mirror and the first dielectric mirror are positioned such that the second dielectric coating and first dielectric coating form an optical cavity and the first layer of the first plurality of layers and the second plurality of layers is sized to be an odd multiple of half a wavelength of the incident laser beam; and
targeting a laser beam incident upon the first or second dielectric coating to form a resonating wave between the dielectric mirrors.

13. The method of claim 12, wherein the sizes of the first layer of the first plurality of layers and the second plurality of layers are different.

14. The method of claim 12, wherein the first dielectric mirror comprises a receiving surface opposite the first dielectric coating, wherein the first dielectric mirror is configured to receive the laser beam at the receiving surface and to transmit the laser beam from the first dielectric coating, such that the laser beam is incident upon the second dielectric mirror.

15. The method of claim 12, wherein the first mirror is configured to be a mechanical oscillator.

16. The method of claim 15, wherein the first mirror has a mass large enough to remain stationary when subjected to radiation pressure from the incident laser beam.

17. The method of claim 12, wherein the second mirror is configured to be a mechanical oscillator.

18. The method of claim 17, wherein the second mirror has a mass small enough to move in response to radiation pressure exhibited by the incident laser beam.

19. The method of claim 18, wherein the first mirror is suspended as a single or multi-stage pendulum.

20. The method of claim 17, wherein the second mirror is suspended as a single or multi-stage pendulum.

* * * * *